United States Patent
Whitman et al.

(10) Patent No.: US 10,885,221 B2
(45) Date of Patent: Jan. 5, 2021

(54) OBFUSCATING AUDIBLE COMMUNICATIONS IN A LISTENING SPACE

(71) Applicant: International Business Machines Corporation, Armonk, NY (US)

(72) Inventors: Todd R. Whitman, Bethany, CT (US); Aaron K. Baughman, Silver Spring, MD (US); David Bastian, Dupage, IL (US); Nicholas A. McCrory, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/161,644

(22) Filed: Oct. 16, 2018

(65) Prior Publication Data

US 2020/0117828 A1    Apr. 16, 2020

(51) Int. Cl.
| | |
|---|---|
| *H04L 29/06* | (2006.01) |
| *G06F 21/62* | (2013.01) |
| *G10L 25/51* | (2013.01) |
| *G06N 3/08* | (2006.01) |

(52) U.S. Cl.
CPC ...... *G06F 21/6245* (2013.01); *G06F 21/6227* (2013.01); *G06N 3/08* (2013.01); *G10L 25/51* (2013.01)

(58) Field of Classification Search
CPC ... G06F 21/6245; G06F 21/6227; G06N 3/08; G10L 25/51
USPC .......................................................... 726/28
See application file for complete search history.

(56) References Cited

U.S. PATENT DOCUMENTS

| | | | |
|---|---|---|---|
| 7,143,028 B2 | 11/2006 | Hillis et al. | |
| 7,376,476 B2* | 5/2008 | Gatts | H04H 60/07 381/2 |
| 7,831,866 B2* | 11/2010 | Archer | H04L 41/0677 370/241 |
| 8,190,438 B1* | 5/2012 | Nelissen | G10L 21/00 381/85 |
| 2006/0247919 A1 | 11/2006 | Specht et al. | |
| 2007/0165001 A1* | 7/2007 | Boss | G06F 3/0202 345/168 |

(Continued)

OTHER PUBLICATIONS

Djebbar, Fatiha et al.; "Comparative study of digital audio steganography techniques"; EURASIP Journal on Audio, Speech, and Music Processing; 2012; Copyright 2012 Springer; pp. 16; <http://asmp.eurasipjournals.com/content/2012/1/25>.

(Continued)

*Primary Examiner* — Haresh N Patel
(74) *Attorney, Agent, or Firm* — Peter K. Suchecki

(57) ABSTRACT

A system, method and program product for obfuscating audible messages in a listening space A system is provided that includes an orchestrator having: an invocation detection system that triggers an obfuscation event; a system for selecting injector nodes in the listening space for the obfuscation event; and a key management system that distributes keys, derived from a natural interface key, to the injector nodes to cause the injector nodes to inject sounds into the listening space to obfuscate an audible message broadcast by a source node for a target node; and a machine learning system that calculates the natural interface key based on interactions captured from the source node in the listening space.

20 Claims, 5 Drawing Sheets

(56) References Cited

U.S. PATENT DOCUMENTS

| | | |
|---|---|---|
| 2009/0147958 A1 | 6/2009 | Calcaterra et al. |
| 2011/0231661 A1* | 9/2011 | Ramakrishnan .... H04L 63/0407 713/171 |
| 2013/0091078 A1* | 4/2013 | Allam ................ G06Q 10/0633 706/12 |
| 2013/0144619 A1 | 6/2013 | Lord et al. |
| 2013/0185061 A1 | 7/2013 | Arvanaghi et al. |
| 2014/0006017 A1 | 1/2014 | Sen |
| 2014/0328486 A1* | 11/2014 | Gopinath ................ H04R 3/00 381/56 |
| 2015/0066481 A1* | 3/2015 | Terrell ................ G10H 1/0091 704/9 |
| 2015/0264128 A1* | 9/2015 | Huang ................ H04L 67/1014 709/203 |
| 2015/0286702 A1* | 10/2015 | Shyr ....................... G06F 16/35 707/737 |
| 2015/0286707 A1* | 10/2015 | Levitan ................ G06F 16/285 707/737 |
| 2015/0347922 A1* | 12/2015 | Hamann ................ G06N 20/00 706/12 |
| 2018/0018579 A1* | 1/2018 | Xu ........................ G06N 20/00 |
| 2018/0225653 A1* | 8/2018 | Vokes ................ G06F 21/577 |
| 2019/0183403 A1* | 6/2019 | Gand .................... A61B 8/0808 |
| 2019/0222570 A1* | 7/2019 | Krishan .............. H04L 63/0853 |
| 2019/0377901 A1* | 12/2019 | Balzer ................ G06F 21/6254 |

OTHER PUBLICATIONS

Mazurczyk, Wojciech; "VoIP Steganography and Its Detection—A Survey"; ACM Computing Surveys; vol. 46; No. 2; Article 20; Publication Date Nov. 2013; pp. 21.

Mazurczyk, Wojciech et al.; "Steganography in Moder Smartphones and Mitigation Techniques"; pp. 25 Aug. 27, 2014.

\* cited by examiner

US 10,885,221 B2

OBFUSCATING AUDIBLE COMMUNICATIONS IN A LISTENING SPACE

TECHNICAL FIELD

The subject matter of this invention relates to obfuscating audible messages, and more particularly to a system and method of injecting noise into a listening space to obfuscate audible messages broadcast between a source and target.

BACKGROUND

For obvious reasons, open area audible communications among and between humans and artificial intelligence (AI) enabled devices (e.g., IoT systems, computers, smart phones, robots, autonomous vehicles, etc.) lack privacy. Anyone or thing can easily eavesdrop on a conversion so long as they are present within a listening space. While it is relatively straightforward to protect electronic communications, e.g., using encryption, the same is not the case for audible communications. As AI enabled devices become more embedded into our daily lives, engaging in private audible communications (human to human, device to device, or human to device) becomes more and more difficult.

SUMMARY

Aspects of this disclosure provide a platform to mask audible interactions between and among AI enabled devices and humans in open listening spaces. One approach includes a method of natural interaction steganography whereby audible injections are introduced to obfuscate natural languages and sound interpretation. An orchestrator may for example create multiple simultaneous conversations and implement microphone switching, turning on/off a microphone, to allow a target node to hear the intended audible message and sounds from a source node. As a result, eavesdroppers cannot understand a private conversation without fluidly following the logic. Depending on risks involved (e.g., number of humans or devices present, sensitivity of the conversation, etc.), the density of injected content can be adjusted. Context switching is employed by the intended target node to interpret the original message from the obfuscated message.

A first aspect discloses a system for obfuscating audible messages in a listening space, comprising: an orchestrator having: an invocation detection system that triggers an obfuscation event; a system for selecting injector nodes in the listening space for the obfuscation event; and a key management system that distributes keys, derived from a natural interface key, to the injector nodes to cause the injector nodes to inject sounds into the listening space to obfuscate an audible message broadcast by a source node for a target node; and a machine learning system that calculates the natural interface key based on interactions captured from the source node in the listening space.

A second aspect discloses a computer program product stored on a computer readable storage medium, which when executed by a computing system, provides obfuscation of audible messages in a listening space, the program product comprising: program code that triggers an obfuscation event; program code for selecting injector nodes in the listening space for the obfuscation event; program code that distributes keys, derived from a natural interface key, to the injector nodes to cause the injector nodes to inject sounds into the listening space to obfuscate an audible message broadcast by a source node for a target node; and program code that calculates the natural interface key using machine learning based on interactions captured from the source node.

A third aspect discloses a computerized method that provides obfuscation of audible messages in a listening space, the method comprising: capturing audible interactions in a listening space; triggering an obfuscation event based on detection of an invocation; selecting injector nodes in the listening space for the obfuscation event; calculating a natural interface key using machine learning based on interactions captured from a source node in the listening space; and distributing keys, derived from a natural interface key, to the injector nodes to cause the injector nodes to inject sounds into the listening space to obfuscate an audible message broadcast by the source node for a target node.

BRIEF DESCRIPTION OF THE DRAWINGS

These and other features of this invention will be more readily understood from the following detailed description of the various aspects of the invention taken in conjunction with the accompanying drawings in which.

Figure 1:
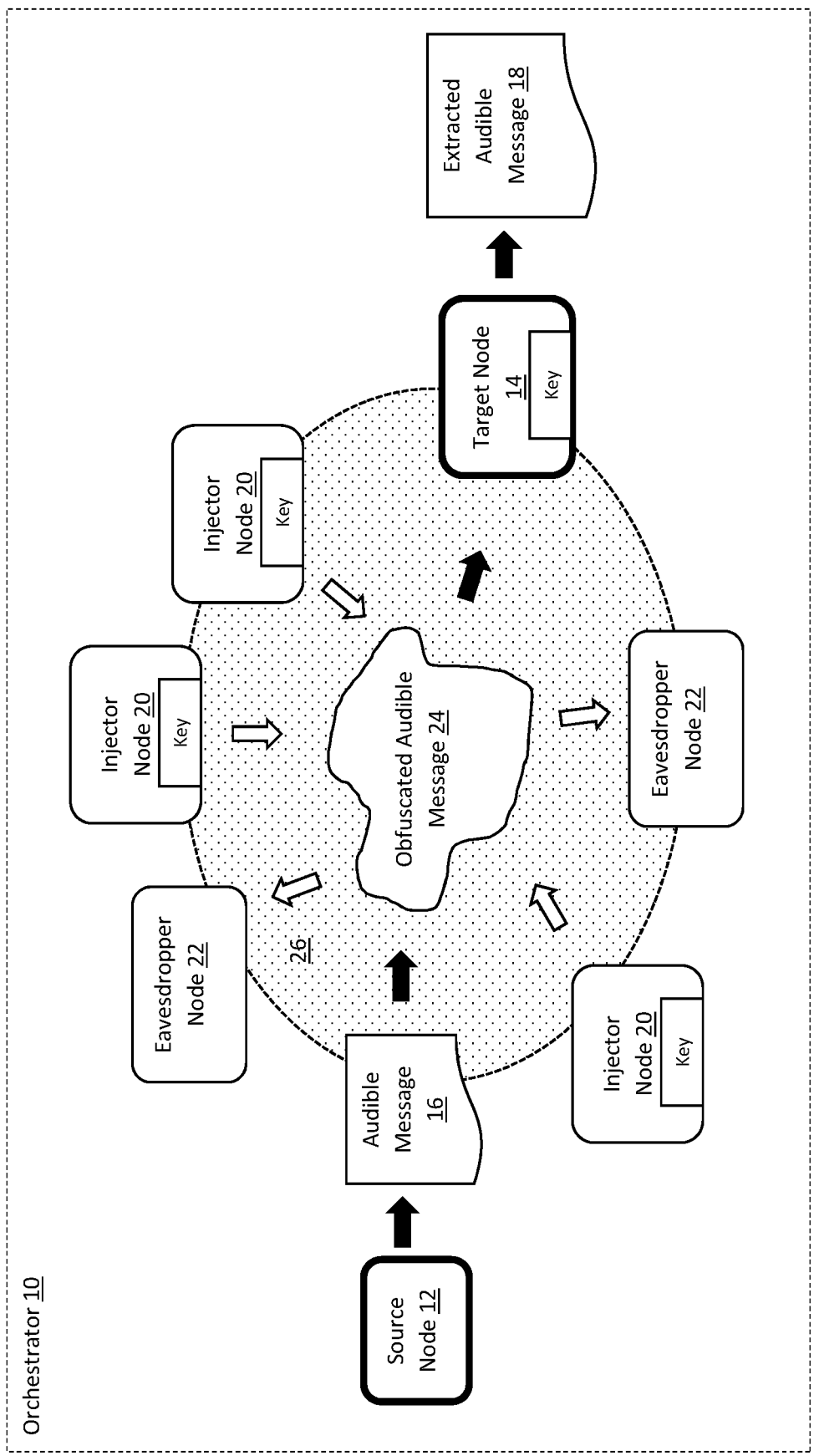
FIG. 1 shows an illustrative system for communicating private messages in an open listening space according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts an overview of an embodiment of an obfuscation platform in which a source node 12 broadcasts an audible message 16 into a listening space 26 intended for a target node 14. Listening space 26 is occupied by various listeners that can hear the audible message 16, including the target node 14, injector nodes 20 and eavesdropper nodes 22. To provide privacy, the audible message 16 is distorted into an obfuscated audible message 24 that cannot be easily understood by listeners in the listening space 26.

To achieve obfuscation, an orchestrator 10 detects the broadcast, and enlists a set of injector nodes 20 to inject coordinated ancillary audible content into the listening space 26 to obfuscate the message (referred to herein as an obfuscation event). In one embodiment, the orchestrator 10 distributes public keys ("keys") to each injector node 20 that direct the injector nodes 20 to broadcast masking sounds according to defined timing, volume, and content parameters. The target node 14 receives a decoding key that allows the target node 14 to obtain an extracted audible message 18. In one embodiment, context switching may be used by the target node 14 to turn a microphone on and off according to a defined scheme to extract the audible message 18.

Nodes shown in FIG. 1 can comprise humans as well as AI enabled devices (e.g., IoT systems, computers, smart phones, robots, etc.), or a combination of both (e.g., a human with a smart device). The listening space 26 may include any space, room, area, arena, etc., in which audible communications can be broadcast and heard.

Triggering of an obfuscation event begins with detection of an invocation, which can include a direct human verbal command, an indirect command auto-detected by a computing device, an environment condition detecting necessity of privacy, etc. For instance, the computing device could detect objects in the space 26, unknown nodes or people present, emotional state of the source node 12, or general situations where an obfuscation event is warranted.

This platform for protecting communications can be useful for security or sensitive situations where an eavesdropping node 22 (human or AI enabled device) is within "earshot" of the audible message, making it difficult to or disallowing deciphering of the obfuscated audible message 24. The audible message 16 does not necessarily need to be in a well-known language—although it can be depending on the level of security required. For instance any learned/ created audible language and tonality between AI enabled devices could be communicated. Tonality of the audible message could convey an emotional state of the message in the communication. Tonality sounds can be their own language or a way to communicate emotions without actual semantic meaning. Thus, e.g., robots can be implemented to understand the emotions and intent of other robots by just hearing a sound. In this case, that emotion and intent is only understood if the sound is directed to a robot. Otherwise, peripheral hearing will not pick up the subtle phase shifts in the signal.

Figure 2:
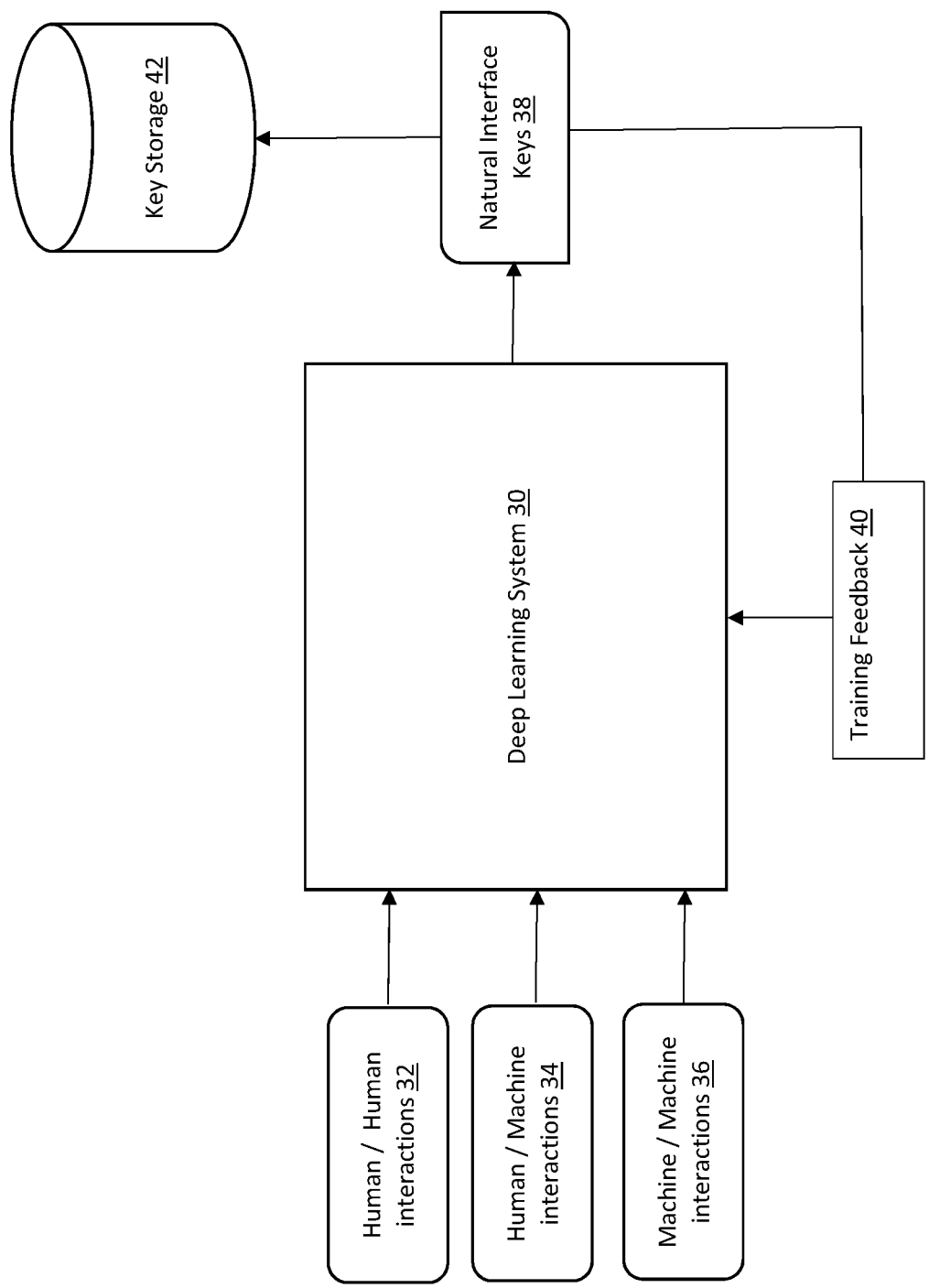
FIG. 2 shows a deep learning environment according to embodiments.

FIG. 2 depicts a deep learning system 30 that derives natural interface keys 38 based on inputted interactions, including human/human interactions 32, human/machine interactions 34, and machine/machine interactions 36. For example, based on current and/or previous inputted interactions of a source node 12, deep learning system 30 can determine a target node 14, a level of privacy required, a type of communication, the type of listening space 26 involved, etc., and incorporate that information into a natural interface key 38 that could be stored and/or processed by key storage 42. Training feedback 40 is utilized either in a training and/or real-time mode to, e.g., train a neural network within the deep learning system. Orchestrator 10 can process/share the derived keys 38 with different injector nodes 20 (FIG. 1).

If a non-human intelligent device is required to obtain a semantic meaning, deep learning system 30 with an auto-encoder can be implemented to create a feature vector representation of the original sound from the source node 12, and then create a scrambled sound from the feature vector that is sent to the target node 14. The scrambled sound is then input into an auto-decoder that creates a feature vector that is then sent into the deep learning system 30 having a sound generator. The generated sound is then communicated to an end user associated with the target node 14. The obfuscation could be done using context switching in addition to emotional encoding.

Figure 3:
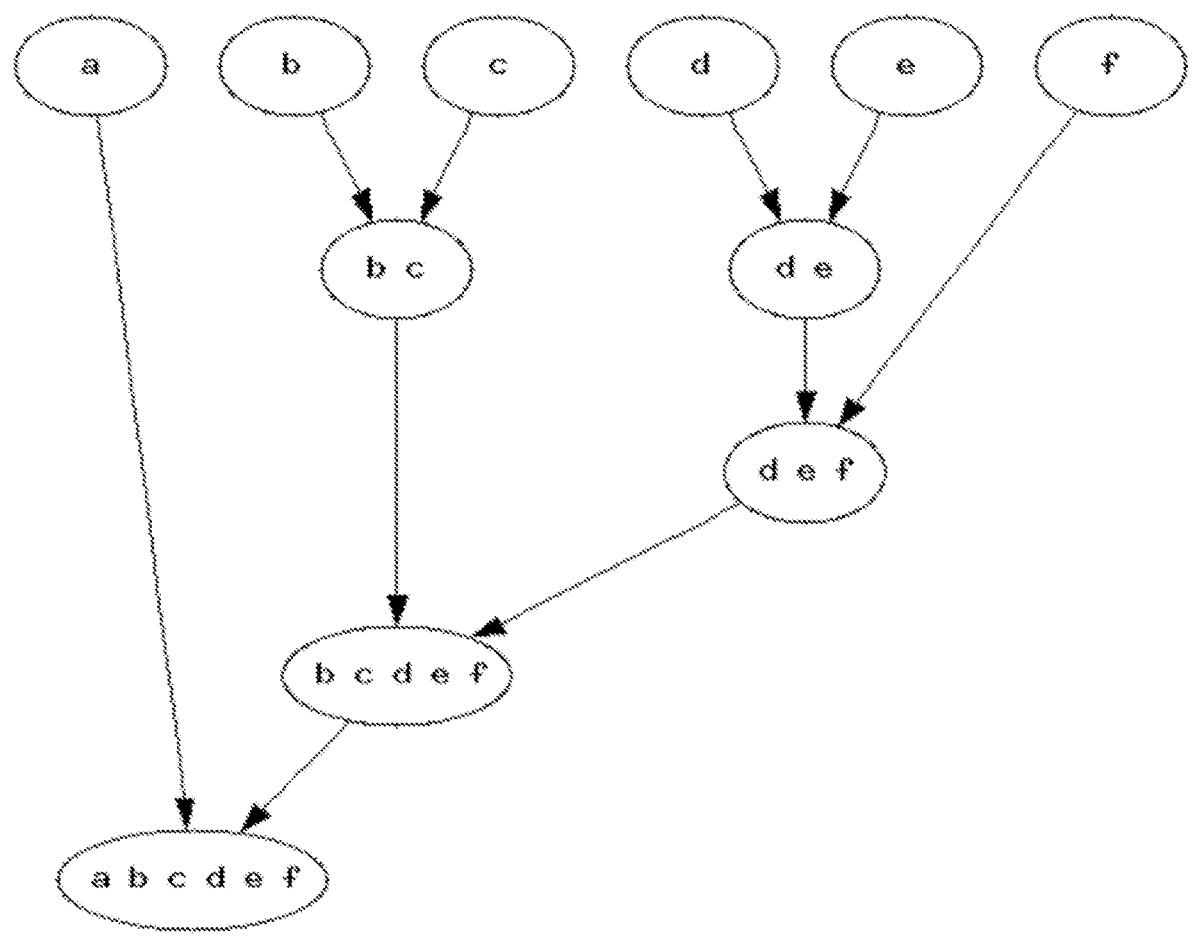
FIG. 3 shows a hierarchical agglomerative clustering process according to embodiments.

Selecting which nodes to use as injector nodes 20 may be implemented in any manner, including with an agglomerative hierarchical clustering algorithm. For example, FIG. 3 shows an agglomerative hierarchical clustering process with levels for different epochs. Using such a clustering algorithm causes different groups of nodes to be selected for injecting content, e.g., based on the deep learning requirements. In this example, the top level has each AI enabled device (A, B, C, D, E, F) in its own cluster. As a result, conversational switching will produce the most secure communication. However, chatter that is similar to that coming from the source node 12 might not be a good cover. At the lowest level, all robots are in the same cluster so it is not possible to inject external conversations.

During a conversation between many AI enabled devices, each device is clustered into a group. Subjects of each sentence are found through natural language processing (NLP) and then broadcast using word embeddings (e.g., Theano). The word embeddings produce high dimensional numerical descriptions of each subject. The average of all word embeddings over a window of time becomes the device's epicenter. Each device is clustered together through the agglomerative hierarchical clustering algorithm.

Each deeper level becomes more uniform. As the levels become uniform, the switching between random speakers within outside clusters becomes sparser. The deeper within the tree, the less secure the group conversation becomes since there are less groups with unrelated clusters to choose. When a cluster is chosen, a random speaker is selected to inject their conversational input into the source group. This effectively masks the chatter within the real conversational group.

Figure 4:
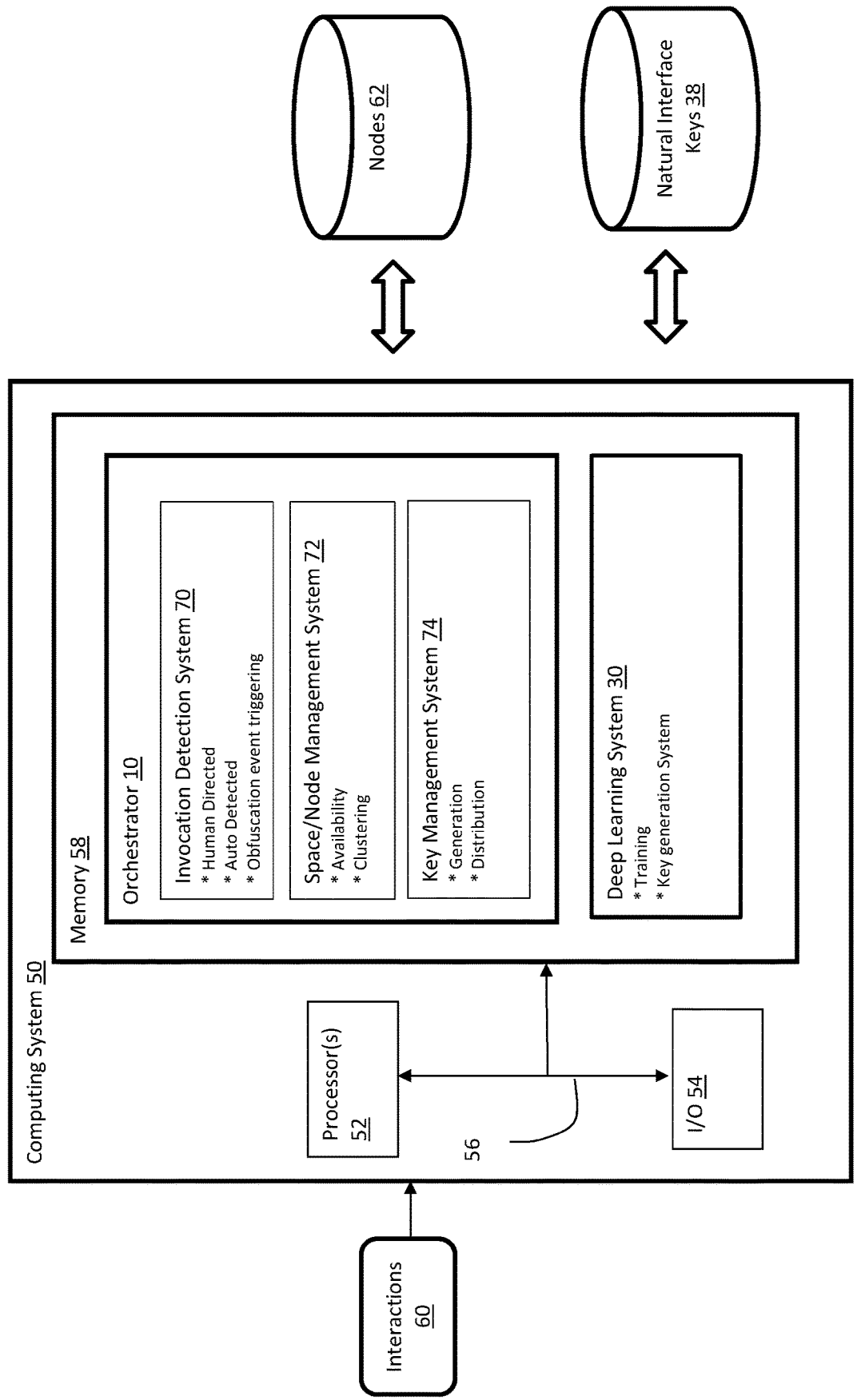
FIG. 4 shows a computing system for implementing obfuscation according to embodiments.

FIG. 4 depicts a computing system 50 for implementing orchestrator 10 and deep learning system 30. As shown, orchestrator 10 generally includes an invocation detection system 70 for triggering an obfuscation event based on a detected invocation condition. Invocation can be determined, e.g., based on a command from a human, using auto-detection such a tonality of an utterance, and/or necessity for example determined by density of nodes in a listening space 26. A space/node management system 72 is provided to characterize the listening space and determine which nodes 62 are available in the listening space 26. As noted, selection of nodes for obfuscation may be implemented with an agglomerative hierarchical clustering algorithm. A key management system 74 is responsible for processing natural interface keys 38 and distributing public keys (i.e., a derived subpart or variant of a natural interface key 38) to selected injector nodes 20 that will inject content into the listening space 26 at defined times, with defined content, at a determined volume, etc. Key management system 74 also provides a decoding key to the target node 14.

Deep learning system 30, as noted herein, is responsible for evaluating interactions between and among humans and AI enabled devices and deriving natural interface keys 38. Natural interface keys 38 can encapsulate various types of information ascertained based on current and/or prior interactions by the source node 12 (and/or other nodes) in the listening space 26 (or other listening spaces), such as the identity of the source 12 and target node 14, identity of the injector nodes 20, required level of privacy, characterization of the listing space 26, language utilized, tonality and volume requirements, timing requirements, etc. Deep learning system 30 may comprise any type of machine learning system, such as a neural network, capable of making probabilistic decisions.

Figure 5:
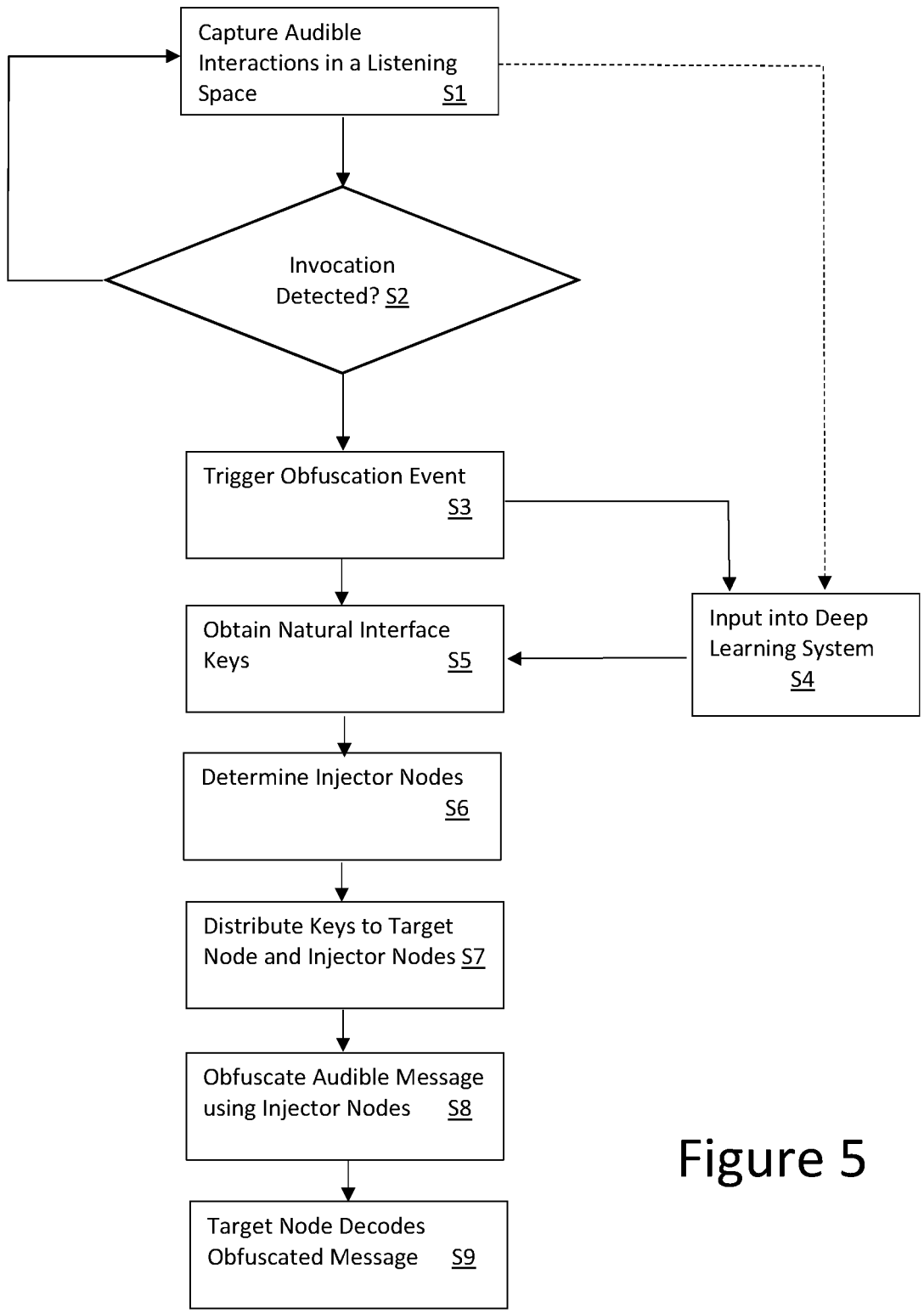
FIG. 5 shows a flow diagram of a method of implementing obfuscation according to embodiments.

FIG. 5 depicts a flow diagram of an illustrative process. At S1, audible interactions in a listening space 26 are captured (e.g., with one or more microphones). The captured interactions are evaluated at S2 to determine if an invocation is detected and if yes, an obfuscation event is triggered at S3. An invocation can be identified by any input that signals that obfuscation is required (e.g., human directed, auto-detected, etc.). If no at S2, the process loops until an invocation is detected.

At the same time, captured audible interactions are input into deep learning system 30 at S4, where information for an obfuscation event is ascertained, e.g., the identities of the source 12 and target nodes 14, type of obfuscation event, etc. (The deep learning system 30 can also be trained with the captured interactions). At S5, natural interface keys 38 are generated for the obfuscation event from the deep learning system 30, and at S6, a set of injector nodes 20 are determined, e.g., using an agglomerative hierarchical clustering algorithm. Next, at S7, public keys, derived from the natural interface key, are distributed to the injector nodes 20 and target node 14. The injector nodes 20 utilize the keys to obfuscate the audible message from the source node 12 at S8 by injecting sounds (e.g., words, conversations, noises, etc.) into the listening space 26. A simple example may include the obfuscated message, "IT stands to reason the cat WOULD listen to the sounds that it hears as the WORK required to do SOMETHING strange might LIKE something similar to chocolate. Sometimes THIS method isn't intended for you," in which the action message is shown in bold, e.g., "it would work something like this."

At S9, the target node 14 uses its decoding key to interpret the obfuscated audible message, e.g., by processing the obfuscated audible message with a context switching microphone that turns on and off based on the key.

It is understood that functions provided by the computing system 50 of FIG. 4 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 50 that may comprise any type of computing device and for example includes at least one processor 52, memory 58, an input/output (I/O) 54 (e.g., one or more I/O interfaces and/or devices), and a communications pathway 56. In general, processor(s) 52 execute program code which is at least partially fixed in memory 58. While executing program code, processor(s) 52 can process data, which can result in reading and/or writing transformed data from/to memory and/or I/O 54 for further processing. The pathway 56 provides a communications link between each of the components in computing system 50. I/O 54 can comprise one or more human I/O devices, which enable a user to interact with computing system 50. Computing system 50 may also be implemented in a distributed manner such that different components reside in different physical locations.

Furthermore, it is understood that the orchestrator 10 and/or deep learning system 30 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for obfuscating audible messages in a listening space, comprising:
a processor; and
a memory, comprising:
an orchestrator having:
an invocation detection system that triggers an obfuscation event;
a system for selecting injector nodes in the listening space for the obfuscation event; and
a key management system that distributes one or more public keys, derived from a natural interface key, to the injector nodes to cause the injector nodes to inject sounds into the listening space to obfuscate an audible message broadcast by a source node for a target node, wherein timing and content of the sounds injected into the listening space by each of the injector nodes are determined by an associated public key provided to the injector node, and
wherein the key management system distributes a decoding key to the target node, wherein the target node extracts the audible message from the listening space using the decoding key; and
a machine learning system that calculates the natural interface key based on interactions captured from the source node in the listening space.

2. The system of claim 1, wherein the obfuscation event is triggered based on at least one of a human directed instruction, an auto detected command, or an environmental situation.

3. The system of claim 1, wherein the injector nodes are selected using an agglomerative hierarchical clustering algorithm.

4. The system of claim 1, wherein the source node comprises one of a human and an AI enabled device and the target node comprises one of a human and an AI enabled device.

5. The system of claim 1, wherein the natural interface key encapsulates at least one of: an identify of the source node, an identity of the target node, and a privacy requirement.

6. The system of claim 1, wherein the machine learning system include a neural network that employs deep learning.

7. A computer program product stored on a non-transitory computer readable storage medium, which when executed by a computing system, provides obfuscation of audible messages in a listening space, the program product comprising:
program code that triggers an obfuscation event;
program code for selecting injector nodes in the listening space for the obfuscation event;
program code that distributes one or more public keys, derived from a natural interface key, to the injector nodes to cause the injector nodes to inject sounds into the listening space to obfuscate an audible message broadcast by a source node for a target node, wherein timing and content of the sounds injected into the listening space by each of the injector nodes are determined by an associated public key provided to the injector node;
program code that distributes a decoding key to the target node, wherein the target node extracts the audible message from the listening space using the decoding key; and program code that calculates the natural interface key using machine learning based on interactions captured from the source node.

8. The program product of claim 7, wherein the obfuscation event is triggered based on at least one of a human directed instruction, an auto detected command, or an environmental situation.

9. The program product of claim 7, wherein the injector nodes are selected using an agglomerative hierarchical clustering algorithm.

10. The program product of claim 7, wherein the source node comprises one of a human and an AI enabled device and the target node comprises one of a human and an AI enabled device.

11. The program product of claim 7, wherein the natural interface key encapsulates at least one of: an identify of the source node, an identity of the target node, and a privacy requirement.

12. The program product of claim 7, wherein the machine learning include a neural network that employs deep learning.

13. A computerized method that provides obfuscation of audible messages in a listening space, the method comprising:
 capturing audible interactions in a listening space;
 triggering an obfuscation event based on detection of an invocation;
 selecting injector nodes in the listening space for the obfuscation event;
 calculating a natural interface key using machine learning based on interactions captured from a source node in the listening space;
 distributing one or more public keys, derived from the natural interface key, to the injector nodes to cause the injector nodes to inject sounds into the listening space to obfuscate an audible message broadcast by the source node for a target node, wherein timing and content of the sounds injected into the listening space by each of the injector nodes are determined by an associated public key provided to the injector node; and
 distributing a decoding key to the target node, wherein the target node extracts the audible message from the listening space using the decoding key.

14. The method of claim 13, wherein the obfuscation event is triggered based on at least one of a human directed instruction, an auto detected command, or an environmental situation.

15. The method of claim 13, wherein the injector nodes are selected using an agglomerative hierarchical clustering algorithm.

16. The method of claim 15, wherein the agglomerative hierarchical clustering algorithm utilizes conversational switching for injecting sounds into the listening space to obfuscate the audible message.

17. The method of claim 16, wherein the agglomerative hierarchical clustering algorithm further utilizes emotional encoding to obfuscate the audible message.

18. The method of claim 13, wherein the source node comprises one of a human and an AI enabled device and the target node comprises one of a human and an AI enabled device.

19. The method of claim 13, wherein the natural interface key encapsulates at least one of: an identify of the source node, an identity of the target node, and a privacy requirement.

20. The method of claim 13, wherein the content of the sounds injected into the listening space is made up of one or more spoken words, and the timing for injecting those spoken words is configured to place the spoken words before and after portions of the audible message.

* * * * *